(No Model.)
A. DIEU.
SPEED GOVERNOR.
No. 367,604. Patented Aug. 2, 1887.
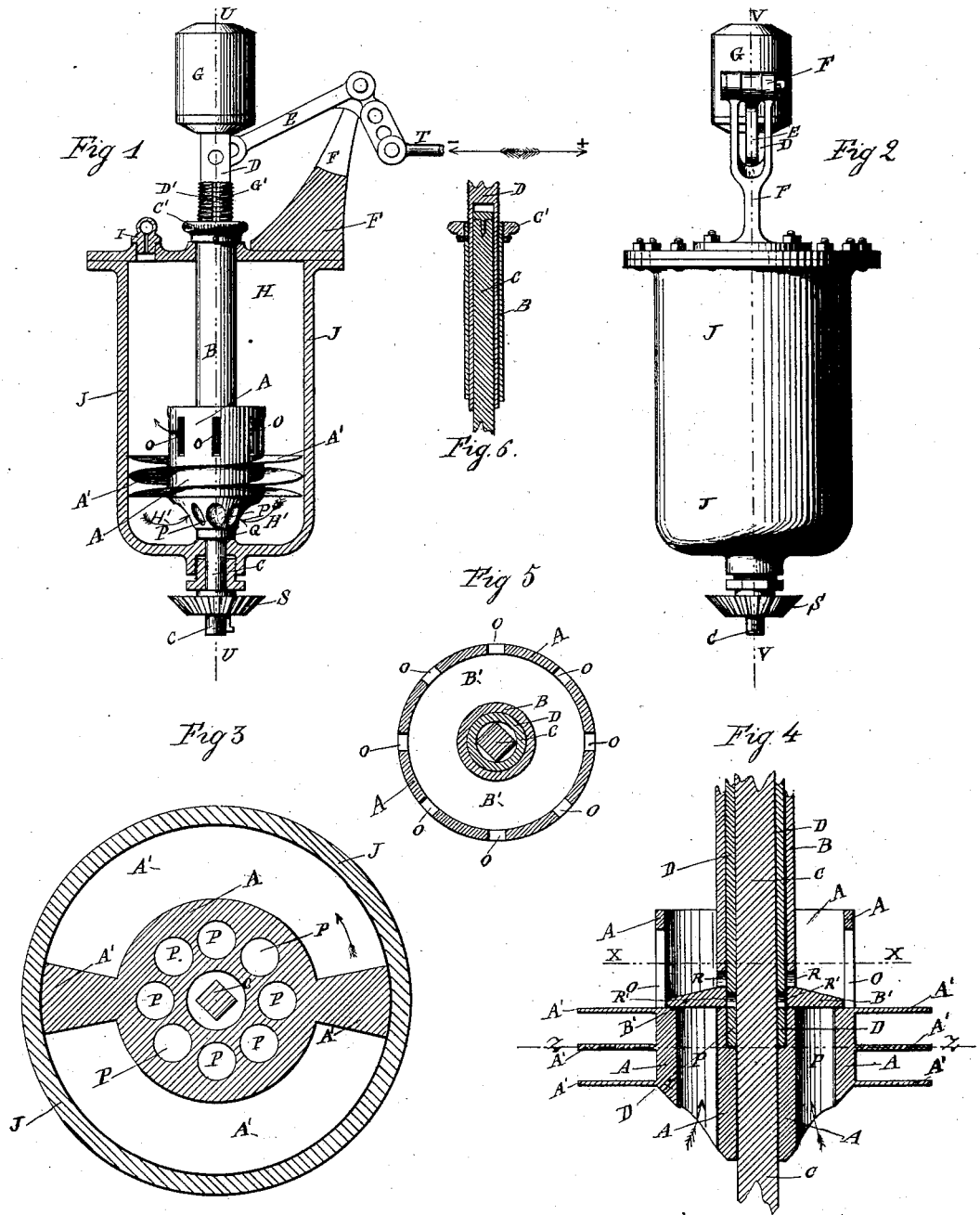
WITNESSES:
Clarence L. Burger
C. Sedgwick
INVENTOR
A. Dieu
BY 
ATTORNEYS

UNITED STATES PATENT OFFICE.

ALEXANDRE DIEU, OF NEW YORK, N. Y.

SPEED-GOVERNOR.

SPECIFICATION forming part of Letters Patent No. 367,604, dated August 2, 1887.

Application filed April 29, 1887. Serial No. 236,571. (No model.)

*To all whom it may concern:*

Be it known that I, ALEXANDRE DIEU, of the city, county, and State of New York, have invented a new and Improved Speed-Governor, of which the following is a full, clear, and exact description.

My invention has for its object to provide for heat-engines, dynamos, and other motors an improved governor, which will allow of a constant given speed, however variable may be the work required of the motor.

The invention consists in a novel construction, combination, and arrangement of parts, as hereinafter fully described, and particularly pointed out in the claims.

Reference is to be had to the accompanying drawings, forming a part of this specification, in which similar letters of reference indicate corresponding parts in all the figures.

Figure 1 is a vertical section of my improved governor on the line $v\,v$ of Fig. 2. Fig. 2 is an elevation of the same. Fig. 3 is a sectional plan on the line $z\,z$ of Fig. 4. Fig. 4 is an enlarged vertical section of the governing-screw and connections, taken on the line $u\,u$ of Fig. 1. Fig. 5 is a sectional plan on the line $x\,x$ of Fig. 4, and Fig. 6 is a detail section on the line $u\,u$ of Fig. 1.

J designates a receptacle, which is adapted to be filled with a suitable liquid, as oil, and is closed on top by a cover bolted or otherwise secured in place.

A vertical shaft, C, which is journaled centrally in the receptacle J, projects through a stuffing-box in the bottom of the same, is supported by an attached collar, Q, above the stuffing-box, and carries on its lower end a bevel-gear, S, which is adapted to be rotated in the usual way from a rotary part of the motor. The part of the shaft C, above its collar Q, is squared and passed loosely through a corresponding hole in the center of the cylindrical core A of the governing-screw, which is thus allowed to slide vertically on, but compelled to turn with, the shaft C. The spiral blade A' of the governing-screw extends around the lower part of the core A, and is arranged to revolve in close proximity to the inner cylindrical surface of the receptacle J. A tubular rod, D, round internally and externally, is received loosely on the shaft C above the governing-screw, and its lower end rests easily in a corresponding recess in the top of the core A. The rod D, which thus does not revolve, but is raised by and falls with the governing-screw, projects through the cover of the receptacle J, carries a weight, G, on its upper end, and is connected by the elbow-lever E, pivoted on the bracket F, with a rod, T, which may be arranged to regulate through suitable devices the power-supply of a heat-motor or the variable resistance of a dynamo.

A series of vertical passages, P, are formed through the lower part of the screw-core A, and are arranged to make, by means of a series of vertical slots, O, formed in the wall of the upper hollow part of the core, communication between that part of the interior of the receptacle J below the screw and that above. Such communication may be interrupted or regulated at will by means of a valve-plate, B', fitted to slide vertically in the upper hollow part of the core, and adapted to close more or less the upper ends of the vertical passages P, the valve-plate B' being formed on the lower end of a vertical sleeve, B, surrounding the tubular rod D. The upper end of the sleeve B, which projects through the receptacle-cover, is internally threaded to engage a corresponding external screw-thread, D', on the non-rotary rod D, and carries an annular milled head, C', by turning which it may be raised or lowered on the rod D, and the valve-plate B' thus adjusted to regulate the passages P as desired. A vertical series of graduations, G', are provided on the screw D' to indicate the adjustment of the valve-plate B' with respect to the passages P. Apertures R and R' are formed in the lower ends of the sleeve B and tubular rod D to permit the entrance of the oil or other liquid employed to the inner bearing-surfaces of the same, and the plug I, which closes the opening in the cover for the introduction of the liquid, is apertured to give free access of air to the receptacle.

The operation is as follows: The spiral blade A' of the screw is so inclined that when revolved it tends to produce a constant upward circulation of the liquid in the receptacle through the passages P and slots O from the space below to that above the screw, while at the same time the reaction tends to raise the screw, and with it the weighted rod D and adjusting-sleeve B. This reaction upon the screw and its system by which the governing action is directly produced is dependent, first, upon the speed of rotation of the screw, and hence of the motor, and, secondly, upon the extent of opening of the passages P. The latter being constant, with a given speed the screw will rise in the liquid until the said reaction is balanced by the weight of the screw and its system, when equilibrium will be established and the power supply maintained constant. When the speed tends to vary, as with a change of resistance, the screw will rise or fall according as the speed tends to increase or decrease, and thus, in the former case, will, through the connections described, diminish the power-supply, or, in the latter case, increase the power-supply, so that the given speed will be maintained however the resistance may vary. On varying the extent of opening of the passages P by means of the adjusting-sleeve, the reaction upon the screw can be varied so as to regulate the point of equilibrium between such reaction and the weighted-screw system, and thus increase or decrease the speed at will without destroying its constancy. The graduations G' may thus be arranged to indicate the speed of the screw or of the motor, which will be obtained by setting the sleeve B in accordance therewith, so that any given constant speed may be obtained by properly adjusting the sleeve.

Having thus fully described my invention, I claim as new and desire to secure by Letters Patent.

1. The combination, in a speed-governor, of a liquid-containing receptacle, an axially-movable spiral blade mounted to revolve therein, a passage for leading the liquid from the space below the blade to that above the same, means for regulating the extent of opening of the passage, and governing devices operated by the axial movement of the spiral blade, substantially as described.

2. The combination, in a speed-governor, of a liquid-containing receptacle, a rotary screw therein consisting of a central core and an external spiral blade, and a passage leading from the bottom to the top of the core, substantially as shown and described.

3. The combination, in a speed governor, of a liquid-containing receptacle, a vertical shaft journaled therein, a screw mounted to slide vertically on but compelled to turn with the said shaft, an axially-movable rod resting loosely upon the screw, a weight upon said rod, and governing devices operated by the movement of the same, substantially as shown and described.

4. The combination, in a speed-governor, of a liquid-containing receptacle, an axially-movable screw therein, having a cylindrical core, A, formed with a series of vertical passages, P, in its lower part, and a series of lateral slots, O, in its upper hollow part, and a valve-plate, B', mounted to slide vertically in said hollow part and adapted to close more or less the passages P, substantially as shown and described.

5. The combination, in a speed-governor, of a liquid-containing receptacle, an axially-movable screw therein, having a passage extending upward through its core, a non-rotary rod resting loosely upon the screw, a sleeve adjustable vertically on said rod and projecting through the top of the receptacle, and a valve-plate carried by said sleeve for regulating the passage in the screw-core, substantially as shown and described.

ALEXANDRE DIEU.

Witnesses:
C. SEDGWICK,
E. M. CLARK.